US012556008B2

(12) United States Patent
Kawabe et al.

(10) Patent No.: US 12,556,008 B2
(45) Date of Patent: Feb. 17, 2026

(54) VEHICLE INCLUDING SOLAR PHOTOVOLTAIC POWER GENERATION DEVICE AND DUAL BATTERY CONTROL

(71) Applicant: SUBARU CORPORATION, Tokyo (JP)

(72) Inventors: Maya Kawabe, Tokyo (JP); Yoshitaka Arai, Tokyo (JP); Mami Osawa, Tokyo (JP); Kazuki Furuta, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 123 days.

(21) Appl. No.: 18/691,194

(22) PCT Filed: Sep. 26, 2022

(86) PCT No.: PCT/JP2022/035656
§ 371 (c)(1),
(2) Date: Mar. 12, 2024

(87) PCT Pub. No.: WO2024/069685
PCT Pub. Date: Apr. 4, 2024

(65) Prior Publication Data
US 2025/0141257 A1 May 1, 2025

(51) Int. Cl.
*H02J 7/35* (2006.01)
*B60L 53/51* (2019.01)
(Continued)

(52) U.S. Cl.
CPC .............. *H02J 7/35* (2013.01); *B60R 16/033* (2013.01); *H02J 1/084* (2020.01);
(Continued)

(58) Field of Classification Search
CPC .......... H02J 7/35; H02J 1/084; H02J 7/00047; H02J 7/342; B60R 16/033; B60L 53/51; B60L 58/18; B60L 2210/10; B60L 8/003; B60L 58/13; B60L 58/20; B60L 8/00; Y02T 10/70; Y02T 10/7072
See application file for complete search history.

(56) References Cited

U.S. PATENT DOCUMENTS

2020/0284883 A1* 9/2020 Ferreira ................ G01S 7/4815

FOREIGN PATENT DOCUMENTS

JP 2016-208699 A 12/2016
WO WO-2006044934 A2 * 4/2006 ........ H01M 8/04537

* cited by examiner

*Primary Examiner* — Michael C Zarroli
(74) *Attorney, Agent, or Firm* — Rimon P.C.

(57) ABSTRACT

A processor of a control device of a vehicle performs control to set a first switch to an on state such that power generated by a solar photovoltaic power generation device is supplied to a high-voltage battery while the vehicle is in a ready-to-travel state; in response to a transition from the ready-to-travel state to a parked state, derives a predicted idle time indicating a predicted value of a time for which the vehicle is left idle; determines whether the predicted idle time is longer than a specific time including a polarization elimination time for eliminating polarization of the high-voltage battery; and when it is determined that the predicted idle time is longer than the specific time, performs control to set the first switch to an off state and a second switch to an on state such that the power is supplied to the low-voltage battery.

5 Claims, 9 Drawing Sheets

(51) Int. Cl.
  *B60L 58/18* (2019.01)
  *B60R 16/033* (2006.01)
  *H02J 1/08* (2026.01)
  *H02J 7/00* (2006.01)
  *H02J 7/34* (2006.01)
(52) U.S. Cl.
  CPC .......... *H02J 7/00047* (2020.01); *H02J 7/342* (2020.01); *B60L 53/51* (2019.02); *B60L 58/18* (2019.02)

[SECOND CASE] CASE OF SATISFYING SUPPLIABLE CAPACITY ≤ MAXIMUM DIFFERENCE CAPACITY AND
SUPPLIABLE CAPACITY > FREE CAPACITY
WHERE MAXIMUM DIFFERENCE CAPACITY = FULL CHARGE CAPACITY - LOWER LIMIT CAPACITY
FREE CAPACITY = FULL CHARGE CAPACITY - CURRENT CAPACITY
DIFFERENCE CHARGE CAPACITY = SUPPLIABLE CAPACITY - FREE CAPACITY

[THIRD CASE] CASE OF SATISFYING SUPPLIABLE CAPACITY ≤ EMPTY CAPACITY
WHERE FREE CAPACITY = FULL CHARGE CAPACITY − CURRENT CAPACITY

NO POWER TRANSFER

CHARGING BY SOLAR PHOTOVOLTAIC POWER GENERATION DEVICE

VEHICLE INCLUDING SOLAR PHOTOVOLTAIC POWER GENERATION DEVICE AND DUAL BATTERY CONTROL

CROSS-REFERENCE TO RELATED APPLICATIONS

This application is the U.S. National Phase under 35 U.S.C. § 371 of International Application No. PCT/JP2022/035656, filed on Sep. 26, 2022.

TECHNICAL FIELD

The present invention relates to a vehicle.

BACKGROUND ART

For example, PTL 1 discloses a vehicle including a solar photovoltaic power generation device. In such a vehicle, when a sub-battery has an SOC (State Of Charge) greater than or equal to a threshold and a main battery has an SOC less than or equal to a threshold, power generated by the solar photovoltaic power generation device is supplied to the main battery.

CITATION LIST

Patent Literature

PTL 1: Japanese Unexamined Patent Application Publication No. 2016-208699

SUMMARY OF INVENTION

Technical Problem

For example, if a high-voltage battery (main battery) is constantly charged with power generated by a solar photovoltaic power generation device, polarization occurs in the high-voltage battery. The polarization causes a reduction in the accuracy of deriving the SOC of the high-voltage battery. To address this, the supply of power from the solar photovoltaic power generation device to the high-voltage battery may be temporarily interrupted to eliminate the polarization of the high-voltage battery. However, the interruption of the supply of power from the solar photovoltaic power generation device to the high-voltage battery leads to waste of the power generated by the solar photovoltaic power generation device.

Accordingly, it is an object of the present invention to provide a vehicle in which power generated by a solar photovoltaic power generation device can be used without waste.

Solution to Problem

To solve the above-described problem, a vehicle according to an embodiment of the present invention includes:
a solar photovoltaic power generation device;
a high-voltage battery;
a low-voltage battery;
a first switch capable of turning on and off electrical coupling between the solar photovoltaic power generation device and the high-voltage battery;
a second switch capable of turning on and off electrical coupling between the solar photovoltaic power generation device and the low-voltage battery; and
a control device configured to control on and off of the first switch and the second switch,
the control device including:
one or more processors; and
one or more memories coupled to the one or more processors,
the one or more processors being configured to execute a process including:
performing control to set the first switch to an on state such that power generated by the solar photovoltaic power generation device is supplied to the high-voltage battery while the vehicle is in a ready-to-travel state;
in response to a transition of a state of the vehicle from the ready-to-travel state to a parked state, deriving a predicted idle time indicating a predicted value of a time for which the vehicle is left idle in the parked state;
determining whether the predicted idle time is longer than a specific time including a polarization elimination time, the polarization elimination time being a time taken to eliminate polarization of the high-voltage battery; and
when it is determined that the predicted idle time is longer than the specific time, performing control to set the first switch to an off state and the second switch to an on state such that the power generated by the solar photovoltaic power generation device is supplied to the low-voltage battery.

Advantageous Effects of Invention

According to the present invention, power generated by a solar photovoltaic power generation device can be used without waste.

DESCRIPTION OF EMBODIMENTS

Figure 1:
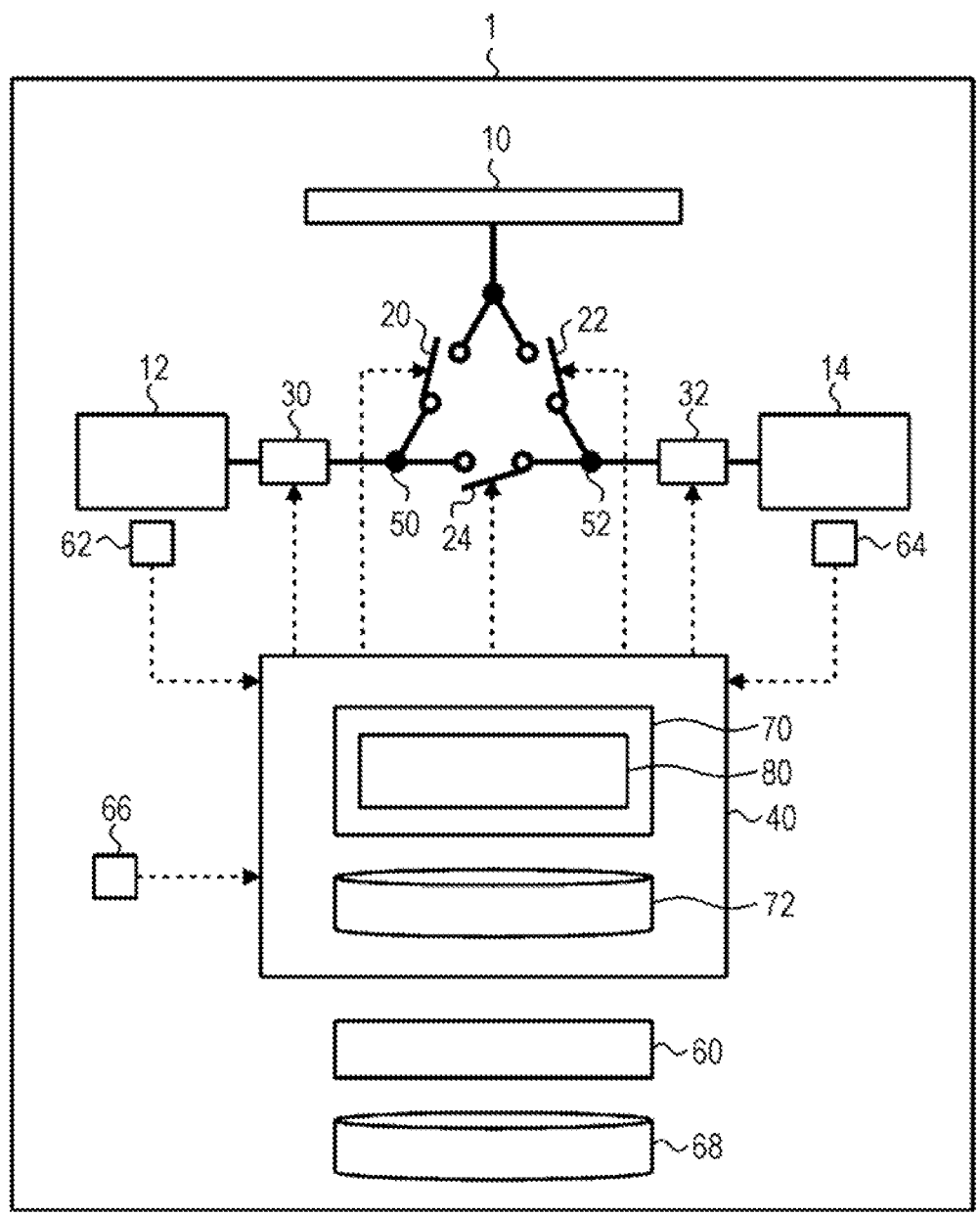
FIG. 1 is a schematic diagram illustrating a configuration of a vehicle according to the present embodiment.

Hereinafter, an embodiment of the present invention will be described in detail with reference to the accompanying drawings. Specific dimensions, materials, numerical values, and the like illustrated in the embodiment are merely examples for facilitating understanding of the invention, and do not limit the present invention unless otherwise specified. In this specification and the drawings, elements having substantially the same functions and configurations are denoted by the same reference numerals, and redundant description thereof will be omitted. In addition, elements that are not directly related to the present invention will not be illustrated in the drawings.

FIG. 1 is a schematic diagram illustrating a configuration of a vehicle 1 according to the present embodiment. The vehicle 1 is, for example, an electric vehicle or a hybrid electric vehicle. The vehicle 1 may be hereinafter referred to as a host vehicle. The vehicle 1 includes a solar photovoltaic power generation device 10, a high-voltage battery 12, a low-voltage battery 14, a first switch 20, a second switch 22, a third switch 24, a first power conversion device 30, a second power conversion device 32, and a control device 40.

The solar photovoltaic power generation device 10 is, for example, a solar panel. The solar photovoltaic power generation device 10 is installed on a roof of the vehicle 1. The solar photovoltaic power generation device 10 converts received solar energy into electric energy to generate power. The solar photovoltaic power generation device may be configured to convert the thermal energy of sunlight into electric energy to generate power.

The high-voltage battery 12 is a chargeable and dischargeable secondary battery. The high-voltage battery 12 has a voltage that is a predetermined voltage greater than or equal to 100 V, for example. The voltage of the high-voltage battery 12 is higher than the voltage of the low-voltage battery 14 described below. The high-voltage battery 12 supplies power to devices coupled to a high-voltage system in the vehicle 1, such as a motor generator that is a source for driving the vehicle 1 to travel, for example.

The low-voltage battery 14 is a chargeable and dischargeable secondary battery, and is provided independently of the high-voltage battery 12. The low-voltage battery 14 has a voltage of, for example, 12 V, 24 V, or the like. The voltage of the low-voltage battery 14 is lower than the voltage of the high-voltage battery 12. The low-voltage battery 14 supplies power to various devices coupled to a low-voltage system in the vehicle 1, such as an electric power steering device and a vehicle dynamic control device. The low-voltage battery 14 is also referred to as an auxiliary battery.

The first switch 20 is, for example, a relay, a semiconductor switch, or the like. The first switch 20 has two contacts. Of the two contacts of the first switch 20, a first contact is coupled to the solar photovoltaic power generation device 10. Of the two contacts of the first switch 20, a second contact is coupled to the high-voltage battery 12 through the first power conversion device 30. The first switch 20 is configured to be capable of turning on and off electrical coupling between the solar photovoltaic power generation device 10 and the high-voltage battery 12.

The second switch 22 is, for example, a relay, a semiconductor switch, or the like. The second switch 22 has two contacts. Of the two contacts of the second switch 22, a first contact is coupled to the solar photovoltaic power generation device 10. Of the two contacts of the second switch 22, a second contact is coupled to the low-voltage battery 14 through the second power conversion device 32. The second switch 22 is configured to be capable of turning on and off electrical coupling between the solar photovoltaic power generation device 10 and the low-voltage battery 14.

The third switch 24 is, for example, a relay, a semiconductor switch, or the like. The third switch 24 has two contacts. Of the two contacts of the third switch 24, a first contact is coupled to the high-voltage battery 12 through the first power conversion device 30. Of the two contacts of the third switch 24, a second contact is coupled to the low-voltage battery 14 through the second power conversion device 32. The third switch 24 is configured to be capable of turning on and off electrical coupling between the high-voltage battery 12 and the low-voltage battery 14.

The on/off control of the first switch 20, the second switch 22, and the third switch 24 is performed by the control device 40 described below.

The first power conversion device 30 is, for example, a bidirectional DC-DC converter. The first power conversion device 30 has two ends capable of electrical input and output. Of the two ends of the first power conversion device 30, a first end is coupled to the high-voltage battery 12. Of the two ends of the first power conversion device 30, a second end is coupled to a node 50 between the second contact of the first switch 20 and the first contact of the third switch 24. The first power conversion device 30 is controlled by the control device 40 described below.

The first power conversion device 30 can convert the voltage of direct-current power input to the first end close to the high-voltage battery 12 into another voltage and output the direct-current power whose voltage has been converted from the second end close to the node 50. Further, the first power conversion device 30 can convert the voltage of direct-current power input to the second end close to the node 50 into another voltage and output the direct-current power whose voltage has been converted from the first end close to the high-voltage battery 12.

For example, when the first switch 20 is in an on state and the third switch 24 is in an off state, the power generated by the solar photovoltaic power generation device 10 is input to the first power conversion device 30 through the first switch 20. In this case, the first power conversion device 30 is controlled to convert the input power and supply the resulting power to the high-voltage battery 12.

For example, the first switch 20 is in an off state and the third switch 24 is in an on state. In this case, the first power conversion device 30 may be controlled to, in cooperation with the second power conversion device 32, convert the power of the high-voltage battery 12 and supply the resulting power to the low-voltage battery 14 through the third switch 24. Alternatively, the first power conversion device 30 may be controlled to, in cooperation with the second power conversion device 32, convert the power of the low-voltage battery 14, which is input through the third switch 24, and supply the resulting power to the high-voltage battery 12.

The second power conversion device 32 is, for example, a bidirectional DC-DC converter. The second power conversion device 32 has two ends capable of electrical input and output. Of the two ends of the second power conversion device 32, a first end is coupled to the low-voltage battery 14. Of the two ends of the second power conversion device 32, a second end is coupled to a node 52 between the second contact of the second switch 22 and the second contact of the third switch 24. The second power conversion device 32 is controlled by the control device 40 described below.

The second power conversion device 32 can convert the voltage of direct-current power input to the first end close to the low-voltage battery 14 into another voltage and output the direct-current power whose voltage has been converted from the second end close to the node 52. Further, the second power conversion device 32 can convert the voltage of direct-current power input to the second end close to the node 52 into another voltage and output the direct-current power whose voltage has been converted from the first end close to the low-voltage battery 14.

For example, when the second switch 22 is in an on state and the third switch 24 is in an off state, the power generated by the solar photovoltaic power generation device 10 is input to the second power conversion device 32 through the second switch 22. In this case, the second power conversion device 32 is controlled to convert the input power and supply the resulting power to the low-voltage battery 14.

For example, the second switch 22 is in an off state and the third switch 24 is in an on state. In this case, the second power conversion device 32 may be controlled to, in cooperation with the first power conversion device 30, convert the power of the low-voltage battery 14 and supply the resulting power to the high-voltage battery 12 through the third switch 24. Alternatively, the second power conversion device 32 may be controlled to, in cooperation with the first power conversion device 30, convert the power of the high-voltage battery 12, which is input through the third switch 24, and supply the resulting power to the low-voltage battery 14.

The vehicle 1 further includes a communication device 60, a first voltage sensor 62, a second voltage sensor 64, a start switch 66, and a storage device 68.

The communication device 60 can communicate with a predetermined server device or the like outside the vehicle 1 via a communication network. For example, the communication device 60 can acquire, from a server device that provides a weather forecast, predicted values of the amounts of solar radiation at and after the current time.

The first voltage sensor 62 detects the voltage of the high-voltage battery 12. The detection result obtained by the first voltage sensor 62 is used, for example, to derive an SOC (State Of Charge) or a charge capacity of the high-voltage battery 12. The SOC indicates a charging rate that is the ratio, expressed in percentage, of the current charge capacity to the full charge capacity of a battery. The charge capacity may be simply referred to as a capacity.

The second voltage sensor 64 detects the voltage of the low-voltage battery 14. The detection result obtained by the second voltage sensor 64 is used, for example, to derive an SOC or a capacity of the low-voltage battery 14.

The start switch 66 receives a ready-on (READY-ON) operation or a ready-off (READY-OFF) operation performed by the occupant of the vehicle 1. When a ready-on operation is performed through the start switch 66, the vehicle 1 is activated and enters a ready-on state. The ready-on state is a state in which the vehicle 1 is ready to travel. When a ready-off operation is performed through the start switch 66, the vehicle 1 is shut down and enters a ready-off state. The ready-off state is a state in which the vehicle 1 is not ready to travel and corresponds to a parked state.

The storage device 68 is a nonvolatile storage element. The nonvolatile storage element may include an electrically readable and writable nonvolatile storage element such as a flash memory.

The control device 40 includes one or more processors 70 and one or more memories 72 coupled to the processor (or processors) 70. The memory (or memories) 72 includes a ROM that stores programs and the like, and a RAM serving as a work area. The processor (or processors) 70 of the control device 40 controls the overall operation of the vehicle 1 in cooperation with a program included in the memory (or memories) 72. The processor (or processors) 70 executes a program to also serve as a charging controller 80.

The charging controller 80 controls on and off of the first switch 20, the second switch 22, and the third switch 24. The charging controller 80 also controls power conversion operations of the first power conversion device 30 and the second power conversion device 32.

In one example, when the vehicle 1 is in a ready-to-travel state, the charging controller 80 performs control to set the first switch 20 to the on state, the second switch 22 to the off state, and the third switch 24 to the off state. In this state, the charging controller 80 controls the operation of the first power conversion device 30 so that the power generated by the solar photovoltaic power generation device 10 is supplied to the high-voltage battery 12. That is, when the vehicle 1 is in the ready-to-travel state, the charging controller 80 performs control to set the first switch 20 to the on state such that the power generated by the solar photovoltaic power generation device 10 is supplied to the high-voltage battery 12.

When the vehicle 1 is in the ready-to-travel state, in response to the SOC of the high-voltage battery 12 reaching 100%, the charging controller 80 may set the first switch 20 to the off state to temporarily interrupt the supply of power from the solar photovoltaic power generation device 10 to the high-voltage battery 12.

As described above, in the vehicle 1, in the ready-to-travel state, basically, power is constantly supplied from the solar photovoltaic power generation device 10 to the high-voltage battery 12, and the high-voltage battery 12 is charged.

If a battery is charged for a long period of time, polarization occurs inside the battery. The polarization is a phenomenon in which electron localization between a positive electrode and a negative electrode of a battery causes a pseudo-potential difference. If such polarization occurs, the voltage of the battery detected by a voltage sensor is higher than the actual voltage by an amount equal to the pseudo-potential difference. This reduces the accuracy of the SOC derived based on the detection result obtained by the voltage sensor. As a result, a situation may arise in which the SOC indicates 100% although the battery has not actually reached full charge.

Such polarization can be eliminated by temporarily interrupting charging of the battery and leaving the battery uncharged for a predetermined amount of time. The predetermined amount of time is, for example, 30 minutes or the like. The predetermined amount of time may be any amount of time as long as polarization can be eliminated. The predetermined amount of time, that is, the time taken to eliminate the polarization, may be hereinafter referred to as a polarization elimination time.

As described above, in the vehicle 1, the high-voltage battery 12 is constantly charged by the solar photovoltaic power generation device 10, and thus, polarization is likely to occur in the high-voltage battery 12. To address this, in some embodiments, in the vehicle 1, the charging of the high-voltage battery 12 by the solar photovoltaic power generation device 10 is temporarily interrupted at a predetermined timing to eliminate the polarization of the high-voltage battery 12. The predetermined timing may be any timing at which the polarization of the high-voltage battery 12 can be appropriately eliminated. For example, the predetermined timing may be a timing of transition of the state of the vehicle 1 from the ready-to-travel state to the parked state.

However, if the charging of the high-voltage battery 12 by the solar photovoltaic power generation device 10 is interrupted, the power generated by the solar photovoltaic power generation device 10 is wasted during interruption of the charging of the high-voltage battery 12.

Accordingly, in response to a transition of the state of the vehicle from the ready-to-travel state to the parked state, the charging controller 80 of the vehicle 1 of the present embodiment derives a predicted idle time indicating a predicted value of a time for which the vehicle 1 is left idle in the parked state.

The time for which the vehicle 1 is left idle in the parked state may be hereinafter referred to as an idle time, for convenience of description. The timing of transition of the state of the vehicle 1 from the ready-to-travel state to the parked state may be referred to as a parking start timing. A timing of transition of the state of the vehicle 1 from the parked state to the ready-to-travel state may be referred to as an activation timing. That is, the idle time indicates the time from the parking start timing to the next activation timing.

The charging controller 80 can store a history of parking start timings and activation timings in the storage device 68. When storing a history of activation timings, the charging controller 80 can use the last parking timing and the current activation timing to derive the idle time from the last parking timing to the current activation timing and can store the idle time in the storage device 68. When storing a parking timing, the charging controller 80 may store additional information, such as a season, a date, a day of the week, a time period, and a position of the vehicle 1, in association with the parking timing. That is, the charging controller 80 can accumulate history data including a parking start timing, an idle time, and related data in the storage device 68.

The charging controller 80 can perform learning by using the history data accumulated in the storage device 68 to construct a predetermined learning model. The predetermined learning model is stored in the storage device 68. The predetermined learning model outputs a predicted idle time, which is a predicted value of the idle time, in response to input of a parking start timing, a season, a date, a day of the week, a time period, a position of the vehicle 1, and the like, for example. The predetermined learning model may be periodically updated.

When the current time point is a parking start timing, the charging controller 80 inputs the current season, date, day of the week, time period, and position of the vehicle 1 to the predetermined learning model. As a result, the charging controller 80 can obtain a predicted idle time for which the vehicle 1 would be left idle from the current time point.

The charging controller 80 determines whether the predicted idle time is longer than a specific time including the polarization elimination time. If the predicted idle time is longer than the specific time, the vehicle 1 is predicted to be left idle in the parked state for an amount of time sufficient to eliminate the polarization. The specific time will be described in detail below.

If it is determined that the predicted idle time is longer than the specific time, the charging controller 80 sets the first switch 20 to the off state. The vehicle 1 is left idle in the parked state in the off state of the first switch 20, thereby sufficiently eliminating the polarization of the high-voltage battery 12.

In addition, if it is determined that the predicted idle time is longer than the specific time, the charging controller 80 sets the second switch 22 to the on state such that the power generated by the solar photovoltaic power generation device 10 is supplied to the low-voltage battery 14. That is, the low-voltage battery 14 is charged by the solar photovoltaic power generation device 10 while the polarization of the high-voltage battery 12 is eliminated. As a result, the vehicle 1 of the present embodiment can achieve both the elimination of the polarization of the high-voltage battery 12 and the prevention of the power generated by the solar photovoltaic power generation device 10 from being wasted. Control performed by the charging controller 80 will be described in detail hereinafter.

Figure 2:
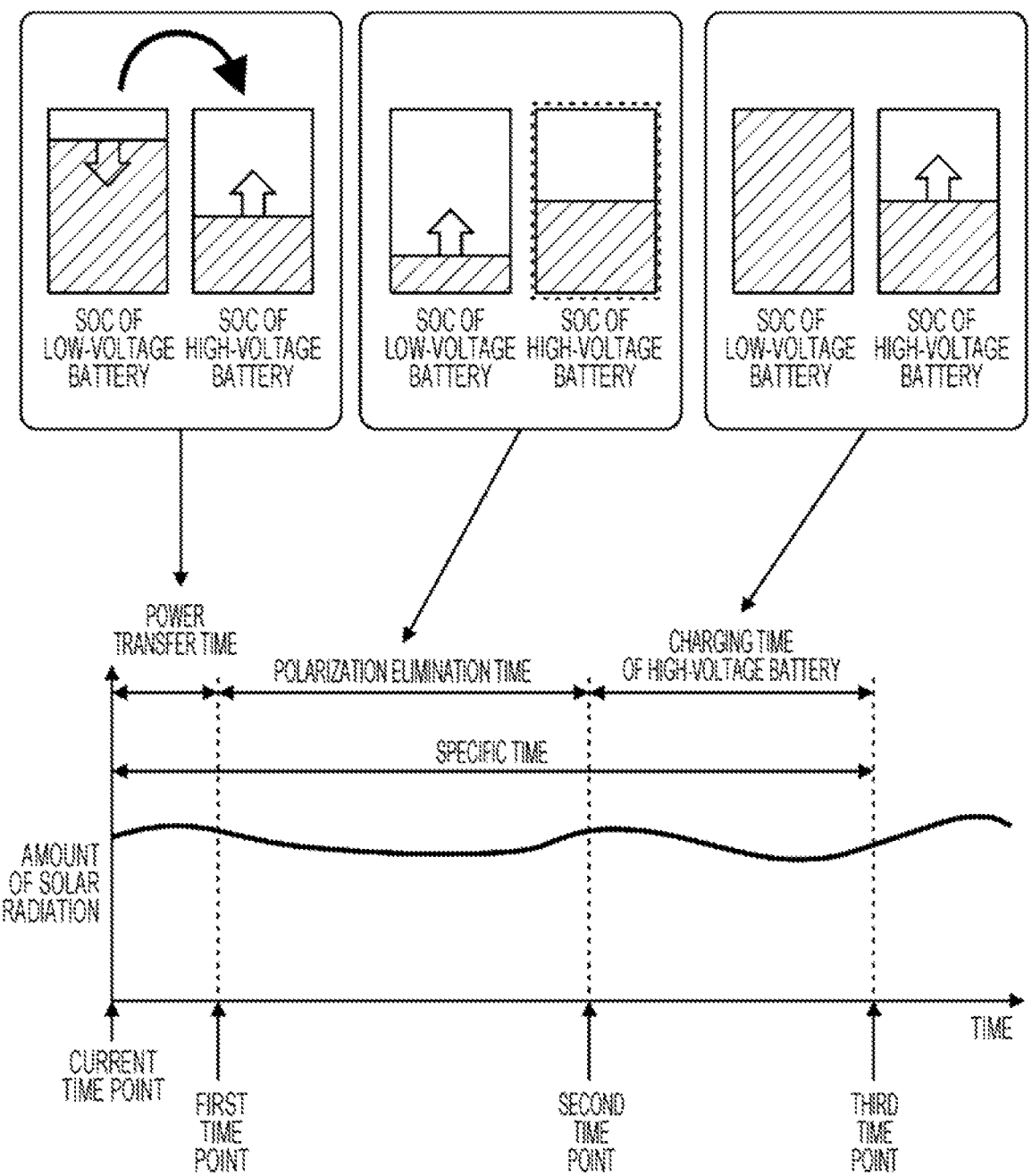
FIG. 2 is a diagram illustrating control performed by a charging controller.

FIG. 2 is a diagram illustrating control performed by the charging controller 80. FIG. 2 illustrates an example of the change in the predicted value of the future amount of solar radiation over time. In FIG. 2, the current time point is a time point at which the state of the vehicle 1 transitions from the ready-to-travel state to the parked state and at which it is determined that the predicted idle time is longer than the specific time. In FIG. 2, a first time point is later than the current time point. A second time point is later than the first time point. A third time point is later than the second time point.

The charging controller 80 can derive the change in the predicted value of the amount of power generated per unit time by the solar photovoltaic power generation device 10, based on the change in the predicted value of the amount of solar radiation per unit time. For example, the charging controller 80 can derive the amount of power generated by the solar photovoltaic power generation device 10 during the time from the current time point to the first time point, based on the predicted value of the amount of solar radiation during the time from the current time point to the first time point.

The charging controller 80 performs control to set the third switch 24 to the on state to transfer a predetermined amount of power from the low-voltage battery 14 to the high-voltage battery 12 before the low-voltage battery 14 is charged by the solar photovoltaic power generation device 10. In FIG. 2, the time from the current time point to the first time point corresponds to a predicted value of a power transfer time. The power transfer time is the time taken to transfer power from the low-voltage battery 14 to the high-voltage battery 12.

The power transfer time and the amount of power to be transferred are determined in consideration of, for example, the current capacity of the low-voltage battery 14, a predicted value of the amount of power generated by the solar photovoltaic power generation device 10 while the polarization is eliminated, and the like. The power transfer time and the amount of power to be transferred will be described in detail below.

Such power transfer decreases the SOC of the low-voltage battery 14 by an amount equal to the amount of power supplied to the high-voltage battery 12. By contrast, the SOC of the high-voltage battery 12 is increased by an amount equal to the amount of power received from the low-voltage battery 14.

After the transfer of power from the low-voltage battery 14 to the high-voltage battery 12, the charging controller 80 electrically isolates the high-voltage battery 12 from the solar photovoltaic power generation device 10 and the low-voltage battery 14 to eliminate the polarization of the high-voltage battery 12. In FIG. 2, the time from the first time point to the second time point corresponds to the polarization elimination time.

With the lapse of the polarization elimination time, the voltage of the high-voltage battery 12 is corrected. As a result, the SOC of the high-voltage battery 12 is corrected. As described above, the low-voltage battery 14 is charged by the solar photovoltaic power generation device 10 while the polarization is eliminated, resulting in an increase in the SOC of the low-voltage battery 14.

After the polarization elimination time has elapsed, the charging controller 80 completes the charging of the low-voltage battery 14 by the solar photovoltaic power generation device 10, and derives the SOC. In FIG. 2, since the polarization elimination time has elapsed at the second time point, the SOC is derived at the second time point. Since the polarization is eliminated, the SOC is corrected to an appropriate value.

After the polarization elimination time has elapsed and the SOC has been derived, the charging controller 80 performs the charging of the high-voltage battery 12 by the solar photovoltaic power generation device 10. In FIG. 2, the time from the second time point to the third time point corresponds to a predicted value of a charging time of the high-voltage battery 12. The charging of the high-voltage battery 12 increases the SOC of the high-voltage battery 12.

As described above, if it is determined that the predicted idle time is longer than the specific time, the following operations are performed in the future: transferring power from the low-voltage battery 14 to the high-voltage battery 12, eliminating the polarization of the high-voltage battery 12, and charging the high-voltage battery 12. That is, the specific time is determined such that the following operations can be appropriately performed during the predicted idle time in the future from the current time point: transferring power from the low-voltage battery 14 to the high-voltage battery 12, eliminating the polarization of the high-voltage battery 12, and charging the high-voltage battery 12. In one example, a time that is the sum of the predicted value of the power transfer time, the polarization elimination time set in advance, and the predicted value of the charging time of the high-voltage battery 12 is set as the specific time.

The specific time is not limited to the time that is the sum of the predicted value of the power transfer time, the polarization elimination time set in advance, and the predicted value of the charging time of the high-voltage battery 12. In one example, the specific time is a time including at least the polarization elimination time. Setting a time including at least the polarization elimination time as the specific time allows appropriate elimination of the polarization of the high-voltage battery 12.

In one example, the charging of the high-voltage battery 12 after the polarization is eliminated is not included in the specific time. In this case, the specific time may be a time including the power transfer time and the polarization elimination time. In one example, the specific time may be a time that is the sum of the predicted value of the power transfer time and the polarization elimination time.

In another example, the transfer of power from the low-voltage battery 14 to the high-voltage battery 12 is not included in the specific time. In this case, the specific time may be a time that is the sum of the polarization elimination time and the predicted value of the charging time of the high-voltage battery 12.

In another example, both the transfer of power from the low-voltage battery 14 to the high-voltage battery 12 and the charging of the high-voltage battery 12 after the polarization is eliminated are not included in the specific time. In this case, the polarization elimination time may be set as the specific time.

The charging of the high-voltage battery 12 after the polarization is eliminated is performed, for example, until the SOC of the high-voltage battery 12 reaches 100%.

The present invention is not limited to an embodiment in which the charging of the high-voltage battery 12 is performed until the SOC of the high-voltage battery 12 reaches 100% after the polarization is eliminated. For example, the charging of the high-voltage battery 12 may be performed until the SOC of the high-voltage battery 12 reaches a predetermined target SOC lower than 100%. Alternatively, for example, the charging of the high-voltage battery 12 may be performed such that the SOC of the high-voltage battery 12 is increased by a predetermined ratio after the polarization is eliminated. The predetermined target SOC and the predetermined ratio may be set to any values that allow the occupant of the vehicle 1 to recognize that the charging of the high-voltage battery 12 has been performed, for example.

The power to be charged in the charging of the high-voltage battery 12 after the polarization is eliminated is power corresponding to the SOC obtained by subtracting the predicted value of the SOC of the high-voltage battery 12 at the second time point from the predicted value of the SOC of the high-voltage battery 12 at the time point when the charging is completed. The predicted value of the SOC of the high-voltage battery 12 at the time point when the charging is completed is, for example, 100%, as described above. The predicted value of the SOC of the high-voltage battery 12 at the second time point is a value obtained by adding the SOC corresponding to the power transferred from the low-voltage battery 14 to the SOC of the high-voltage battery 12 at the current time point.

As described above, the charging controller 80 can derive the change in the predicted value of the amount of power generated per unit time by the solar photovoltaic power generation device 10 at and after the second time point, based on the change in the predicted value of the amount of solar radiation per unit time at and after the second time point. Accordingly, the charging controller 80 can add up the predicted values of the amounts of power generated per unit time by the solar photovoltaic power generation device 10 at and after the second time point to derive the power with which the high-voltage battery 12 is predicted to be charged by the solar photovoltaic power generation device 10 at and after the second time point. The charging controller 80 can specify the charging time by adding up the predicted values of the amounts of generated power until the power derived in the way described above reaches the power to be charged in the charging of the high-voltage battery 12 after the polarization is eliminated.

Next, the transfer of power from the low-voltage battery 14 to the high-voltage battery 12 will be described with reference to FIG. 3 to FIG. 5. The present embodiment includes three cases related to the transfer of power from the low-voltage battery 14 to the high-voltage battery 12.

Figure 3:
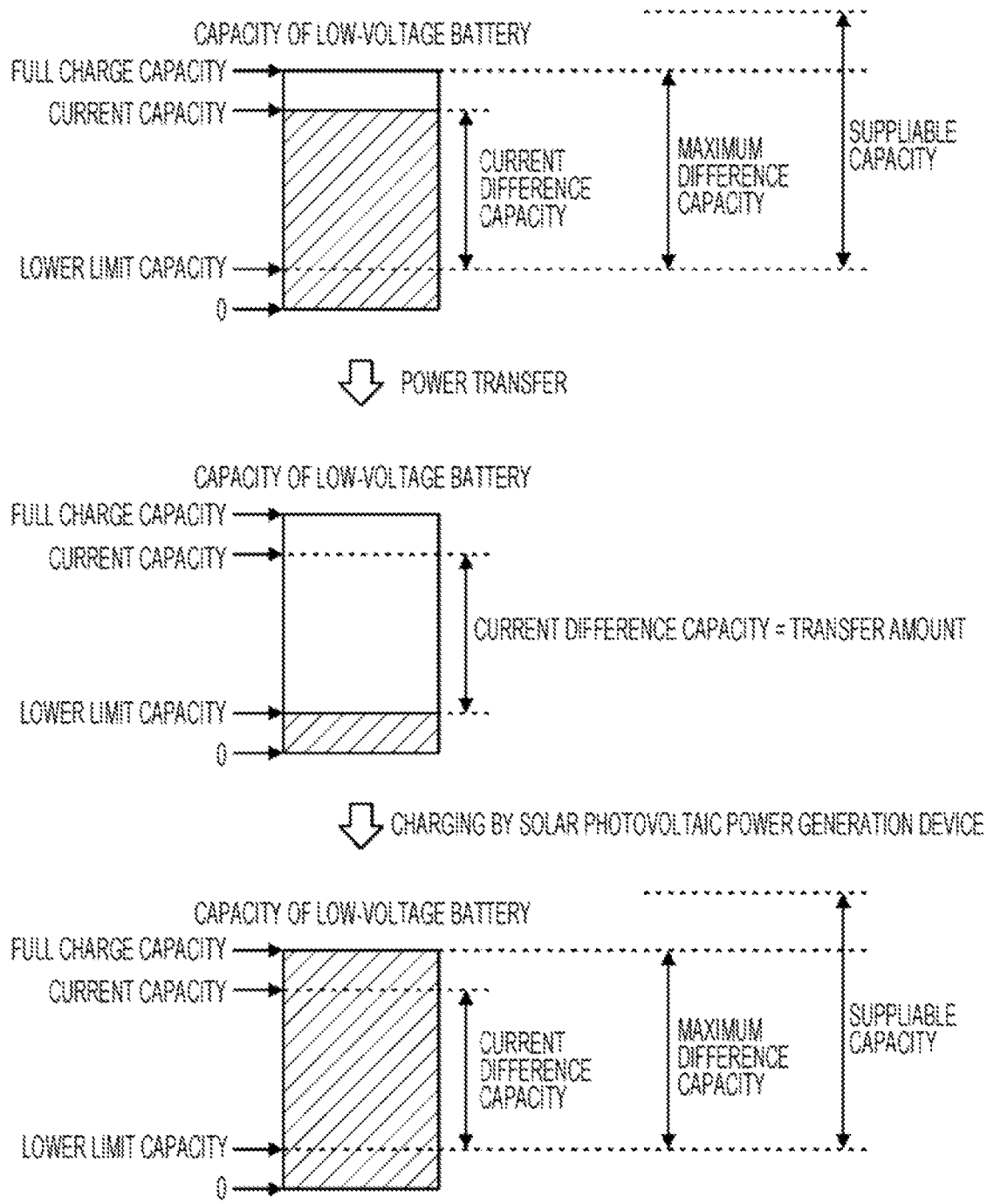
FIG. 3 is a diagram illustrating a first case related to the transfer of power from a low-voltage battery to a high-voltage battery.

FIG. 3 is a diagram illustrating a first case related to the transfer of power from the low-voltage battery 14 to the high-voltage battery 12. FIG. 4 is a diagram illustrating a second case related to the transfer of power from the low-voltage battery 14 to the high-voltage battery 12. FIG. 5 is a diagram illustrating a third case related to the transfer of power from the low-voltage battery 14 to the high-voltage battery 12. In FIG. 3 to FIG. 5, the amount of stored power in the capacity of the low-voltage battery 14 is indicated by hatching.

First, the first case will be described. For convenience of description, the capacity by which the power generated by the solar photovoltaic power generation device 10 is suppliable to the low-voltage battery 14 within the polarization elimination time may be referred to as a "suppliable capacity". As described above, the charging controller 80 can derive the amount of power generated by the solar photovoltaic power generation device 10 during the time from the first time point to the second time point in FIG. 2, based on the predicted value of the amount of solar radiation during the time from the first time point to the second time point. Since the power generated during the time from the first time point to the second time point is suppliable to the low-voltage battery 14, the charging controller 80 can derive the suppliable capacity based on the amount of power generated by the solar photovoltaic power generation device 10 during the time from the first time point to the second time point.

For convenience of description, a value obtained by subtracting the lower limit capacity of the low-voltage battery 14 from the full charge capacity of the low-voltage battery 14 may be referred to as a "maximum difference capacity". The lower limit capacity is a charge capacity indicating a boundary at which the charge capacity is prohibited from being less than the lower limit capacity. The lower limit capacity is set in advance according to the specifications of the low-voltage battery 14 or the like.

For convenience of description, a capacity obtained by subtracting the lower limit capacity from the current capacity may be referred to as a "current difference capacity". The current capacity means the capacity of the low-voltage battery 14 at the current time point in FIG. 2, that is, at the time point when it is determined that the predicted idle time is longer than the specific time.

As illustrated in FIG. 3, the first case is a case where a first condition that the "suppliable capacity" is larger than the "maximum difference capacity" is satisfied.

In the first case, the power corresponding to the "current difference capacity" is determined as the amount of power to be transferred from the low-voltage battery 14 to the high-voltage battery 12. That is, the charging controller 80 derives the suppliable capacity and determines whether the first condition that the suppliable capacity is larger than the maximum difference capacity is satisfied. If it is determined that the first condition is satisfied, the charging controller 80 transfers the power corresponding to the current difference capacity in a power transfer process from the low-voltage battery 14 to the high-voltage battery 12.

In the first case, the power corresponding to the current difference capacity is transferred from the low-voltage battery 14 to the high-voltage battery 12 to decrease the capacity of the low-voltage battery 14 to the lower limit capacity. The low-voltage battery 14 is charged by the solar photovoltaic power generation device 10 within the polarization elimination time to increase the capacity of the low-voltage battery 14. At this time, since the suppliable capacity is larger than the maximum difference capacity, the low-voltage battery 14 can be charged to the full charge capacity.

In view of the above, if the first condition is satisfied, the power transfer time is determined to be a time during which the power corresponding to the "current difference capacity" can be transferred from the low-voltage battery 14 to the high-voltage battery 12.

Next, the second case will be described. For convenience of description, a value obtained by subtracting the current capacity of the low-voltage battery 14 from the full charge capacity of the low-voltage battery 14 may be referred to as a "free capacity". For convenience of description, a value obtained by subtracting the free capacity from the suppliable capacity may be referred to as a "difference charge capacity".

Figure 4:
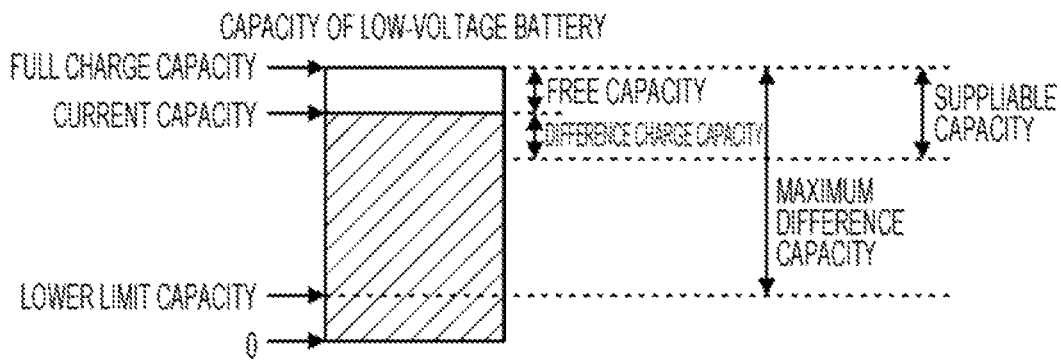
FIG. 4 is a diagram illustrating a second case related to the transfer of power from the low-voltage battery to the high-voltage battery.
Figure 4:
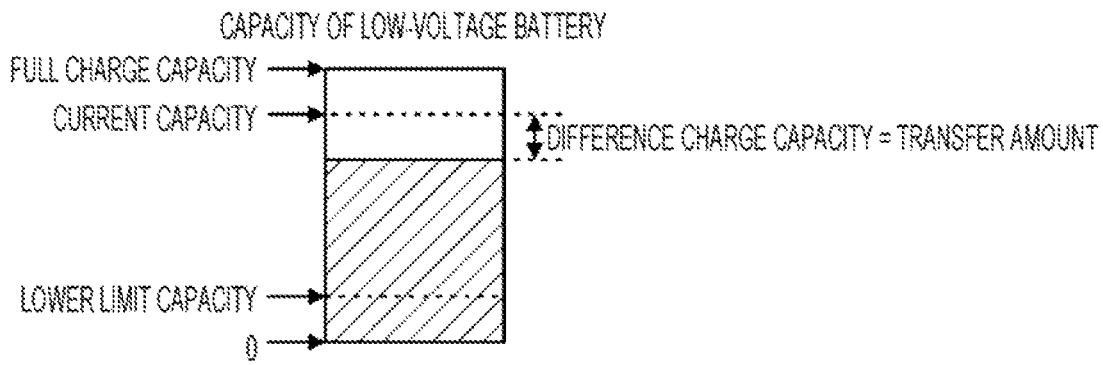
Figure 4:
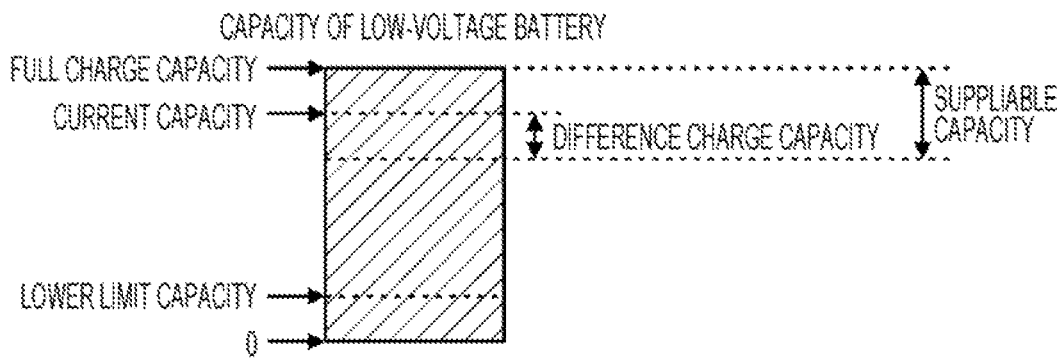
Figure 5:
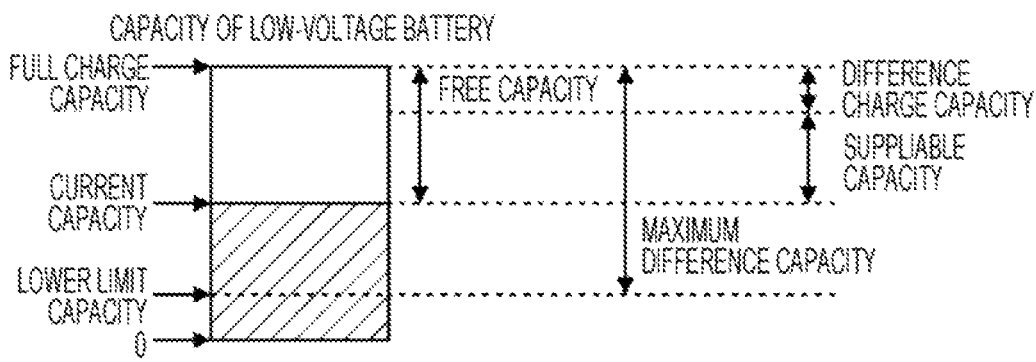
FIG. 5 is a diagram illustrating a third case related to the transfer of power from the low-voltage battery to the high-voltage battery.
Figure 5:
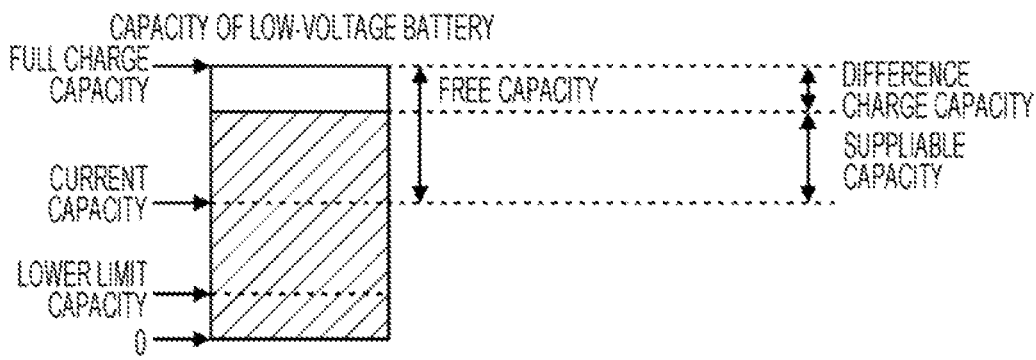

As illustrated in FIG. 4, the second case is a case where a second condition that the "suppliable capacity" is less than or equal to the "maximum difference capacity" and the "suppliable capacity" is larger than the "free capacity" is satisfied.

In the second case, the power corresponding to the "difference charge capacity" is determined as the amount of power to be transferred from the low-voltage battery 14 to the high-voltage battery 12. That is, the charging controller 80 derives the suppliable capacity and determines whether the second condition that the suppliable capacity is less than or equal to the maximum difference capacity and the suppliable capacity is larger than the free capacity is satisfied. If it is determined that the second condition is satisfied, the charging controller 80 transfers the power corresponding to the difference charge capacity in a power transfer process from the low-voltage battery 14 to the high-voltage battery 12.

In the second case, the power corresponding to the difference charge capacity is transferred from the low-voltage battery 14 to the high-voltage battery 12 to decrease the capacity of the low-voltage battery 14 from the current capacity by an amount equal to the difference charge capacity. The low-voltage battery 14 is charged by the solar photovoltaic power generation device 10 within the polarization elimination time to increase the capacity of the low-voltage battery 14 exactly to the full charge capacity of the low-voltage battery 14. That is, the low-voltage battery 14 can be charged to the full charge capacity.

In view of the above, if the second condition is satisfied, the power transfer time is determined to be a time during which the power corresponding to the "difference charge capacity" can be transferred from the low-voltage battery 14 to the high-voltage battery 12.

Next, the third case will be described. As illustrated in FIG. 5, the third case is a case where a third condition that the "suppliable capacity" is less than or equal to the "free capacity" is satisfied.

In the third case, the transfer of power from the low-voltage battery 14 to the high-voltage battery 12 is not performed. That is, the charging controller 80 derives the suppliable capacity and determines whether the third condition that the suppliable capacity is less than or equal to the free capacity is satisfied. If it is determined that the third condition is satisfied, the charging controller 80 performs control to supply power from the solar photovoltaic power generation device 10 to the low-voltage battery 14 without power transfer from the low-voltage battery 14 to the high-voltage battery 12.

In the third case, the low-voltage battery 14 is charged by the solar photovoltaic power generation device 10 within the distribution elimination time without power transfer from the low-voltage battery 14 to the high-voltage battery 12. Thus, the capacity of the low-voltage battery 14 is increased from the current capacity by an amount equal to the suppliable capacity. At this time, since the suppliable capacity is less than or equal to the free capacity, the capacity of the low-voltage battery 14 does not reach the full charge capacity even after the charging of the low-voltage battery 14 by the solar photovoltaic power generation device 10 is completed, making sure that the capacity of the low-voltage battery 14 has a margin.

In view of the above, if the third condition is satisfied, since no power is transferred from the low-voltage battery 14 to the high-voltage battery 12, the power transfer time is determined to be zero.

Figure 6:
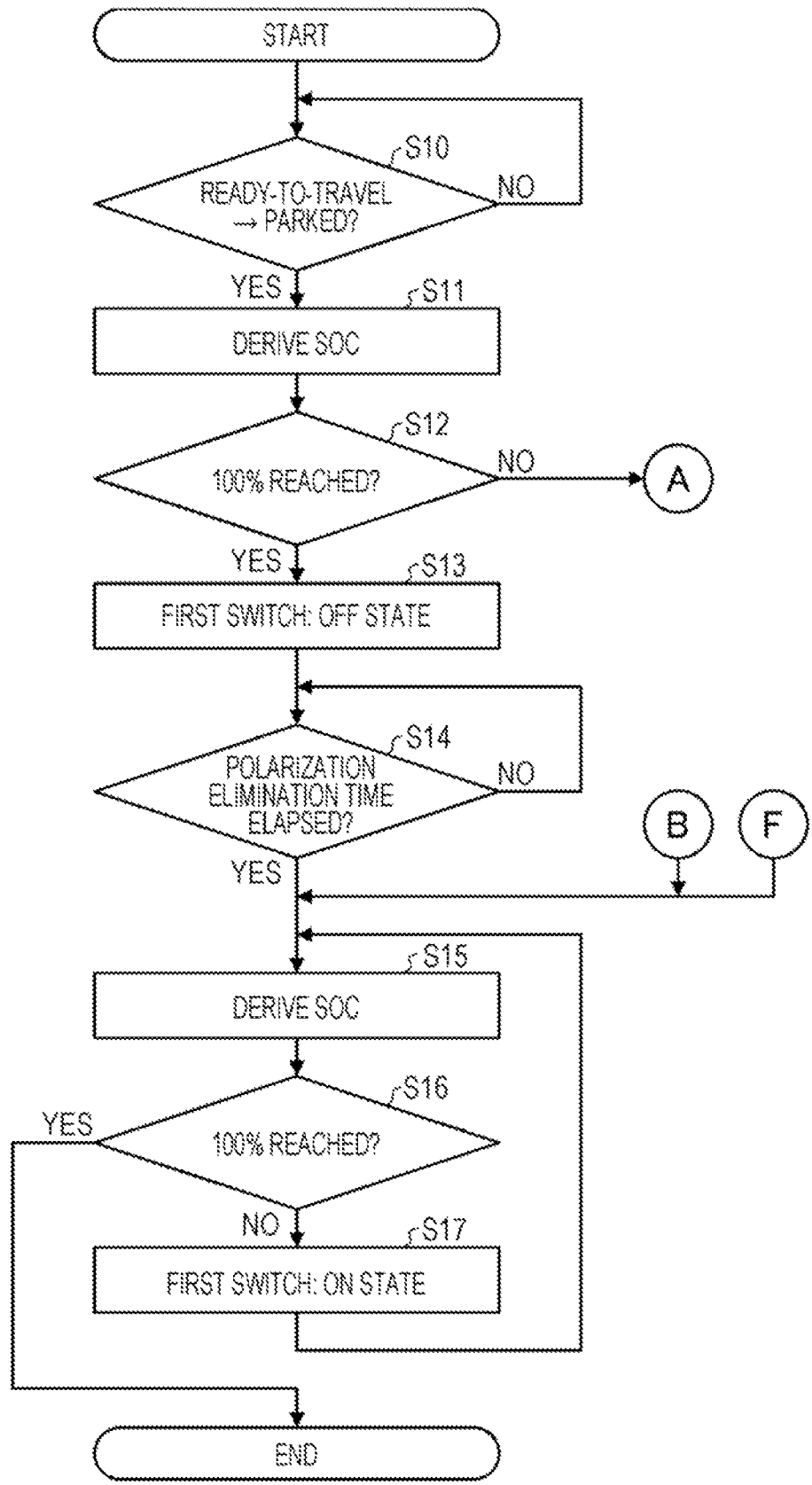
FIG. 6 is a flowchart illustrating the operation flow of the charging controller.
Figure 7:
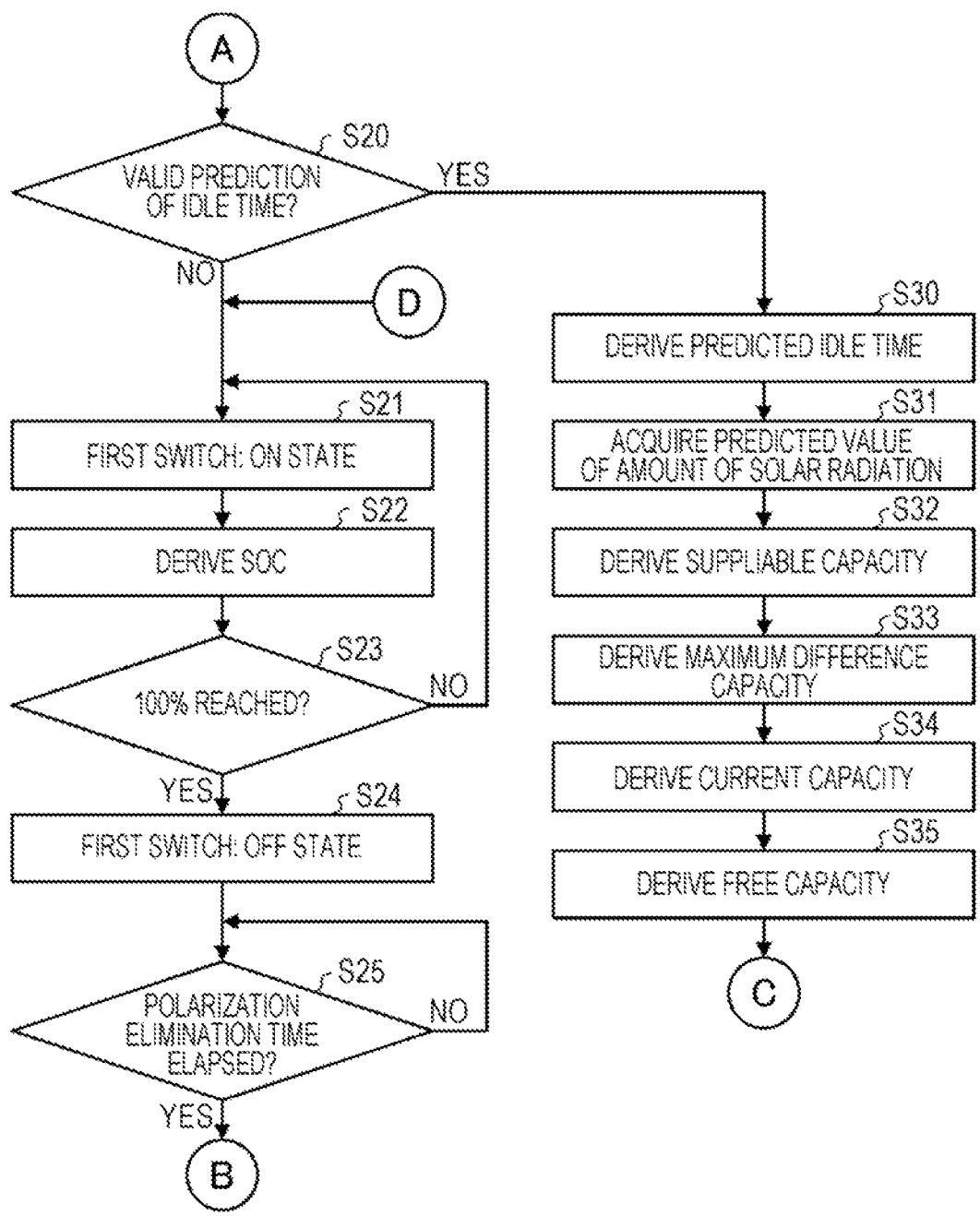
FIG. 7 is a flowchart illustrating the operation flow of the charging controller.
Figure 8:
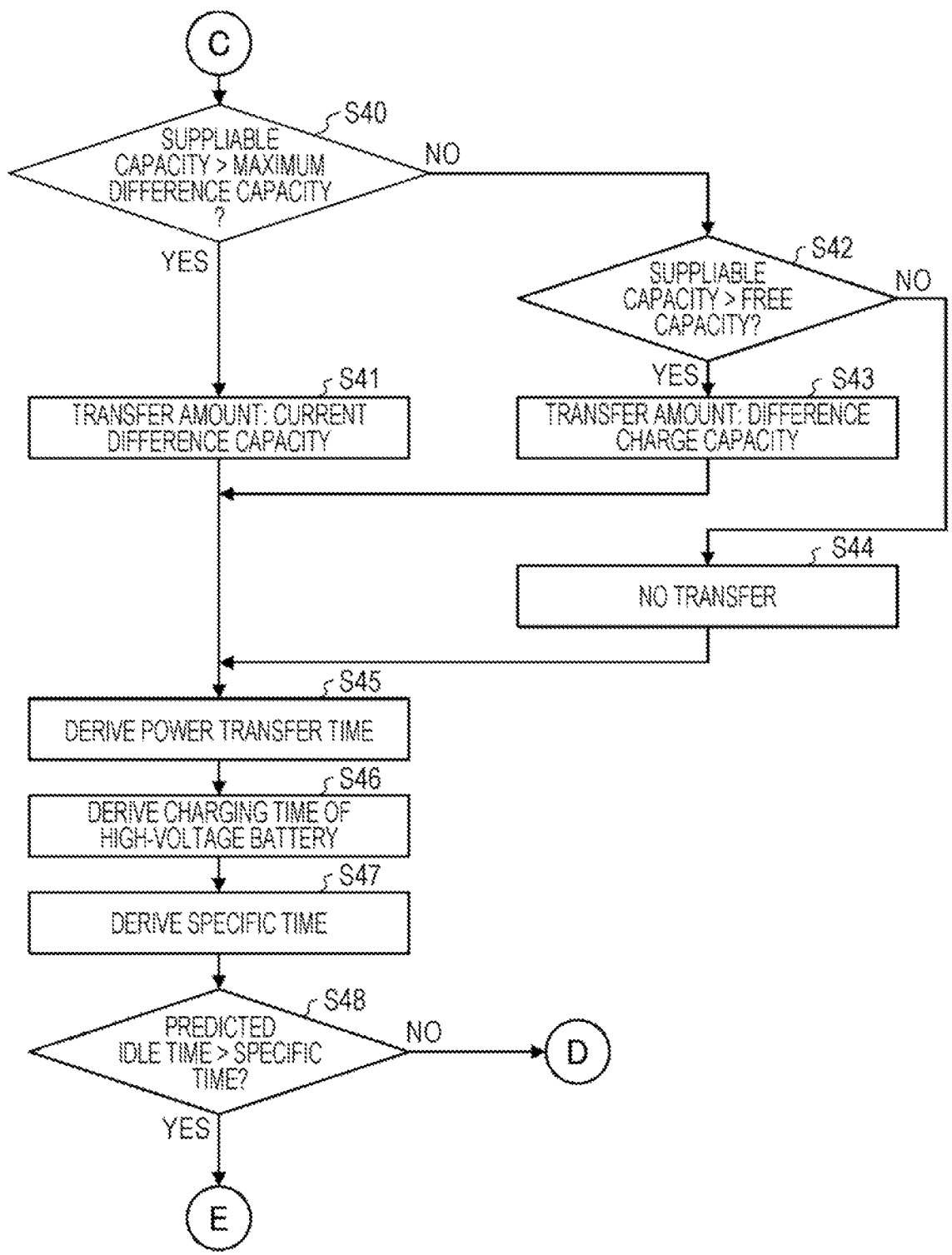
FIG. 8 is a flowchart illustrating the operation flow of the charging controller.
Figure 9:
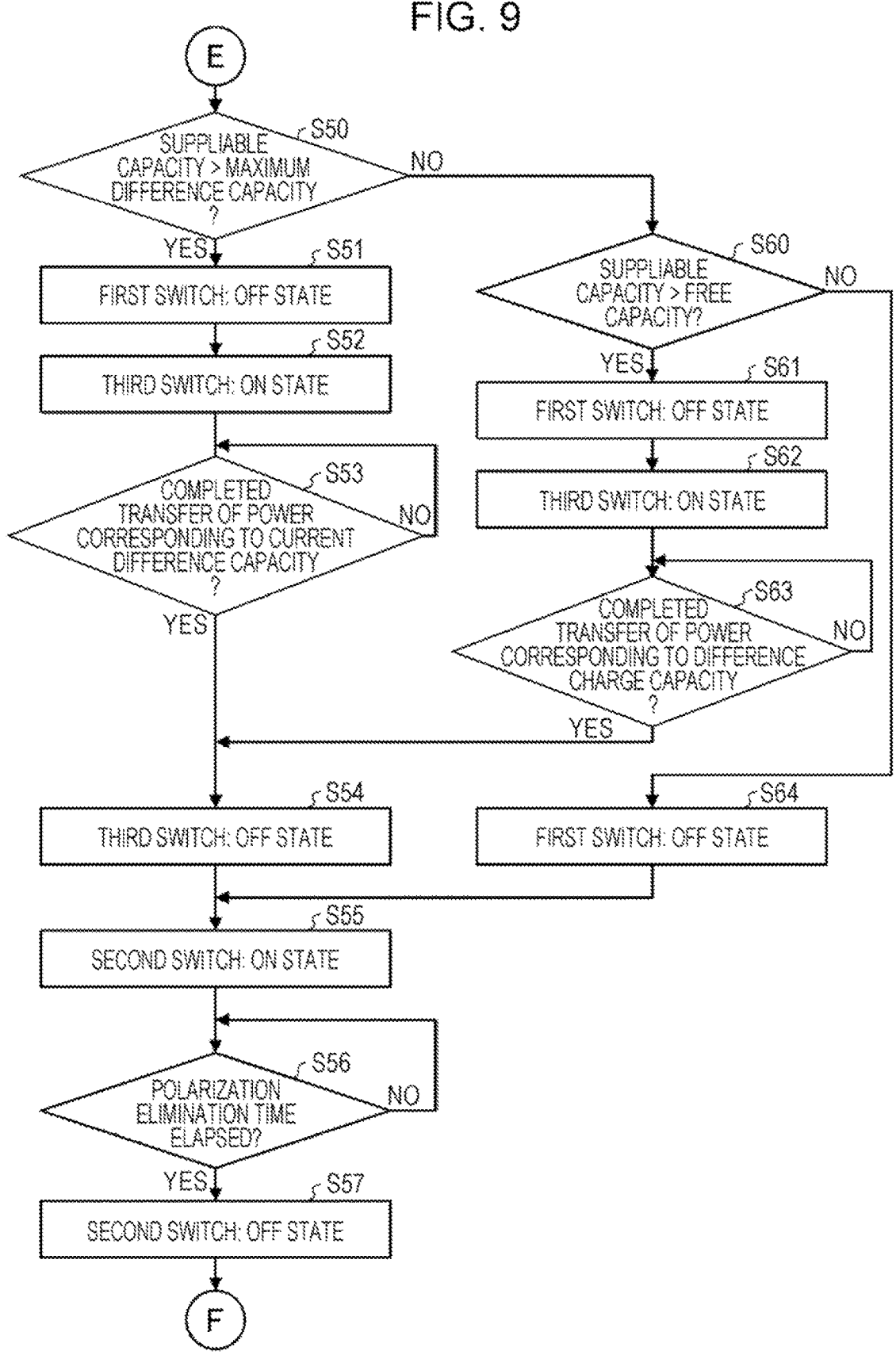
FIG. 9 is a flowchart illustrating the operation flow of the charging controller.

FIG. 6, FIG. 7, FIG. 8, and FIG. 9 are flowcharts illustrating the operation flow of the charging controller 80. In FIG. 6, "A" is linked to "A" in FIG. 7. In FIG. 7, "B" is linked to "B" in FIG. 6. In FIG. 7, "C" is linked to "C" in FIG. 8. In FIG. 8, "D" is linked to "D" in FIG. 7. In FIG. 8, "E" is linked to "E" in FIG. 9. In FIG. 9, "F" is linked to "F" in FIG. 6.

It is assumed here that the vehicle 1 is in the ready-to-travel state. In this state, the first switch 20 is in the on state, the second switch 22 is in the off state, and the third switch 24 is in the off state. When the start switch 66 detects the ready-off operation, the vehicle 1 transitions from the ready-to-travel state to the parked state.

The charging controller 80 waits for the vehicle 1 to transition from the ready-to-travel state to the parked state (NO in S10). If the vehicle 1 transitions from the ready-to-travel state to the parked state (YES in S10), the charging controller 80 performs the processing of step S11 and subsequent steps.

In step S11, the charging controller 80 derives the SOC of the high-voltage battery 12 based on the detection result obtained by the first voltage sensor 62 (S11). The charging controller 80 determines whether the derived SOC has reached 100% (S12).

If the derived SOC has reached 100% (YES in S12), the charging controller 80 sets the first switch 20 to the off state (S13). As a result, the high-voltage battery 12 is electrically isolated from the solar photovoltaic power generation device 10 and the low-voltage battery 14, and the elimination of the polarization is started.

Then, the charging controller 80 determines whether the polarization elimination time has elapsed, based on the time point at which the first switch 20 is switched from the on state to the off state (S14). If the polarization elimination time has not elapsed (NO in S14), the charging controller 80 waits for the polarization elimination time to elapse.

If the polarization elimination time has elapsed (YES in S14), the polarization of the high-voltage battery 12 can be considered to have been eliminated. Then, the charging controller 80 derives the SOC of the high-voltage battery 12 based on the detection result obtained by the first voltage sensor 62 (S15). Since the polarization is eliminated, the detection result obtained by the first voltage sensor 62 is corrected to the actual voltage of the high-voltage battery 12, and the SOC of the high-voltage battery 12 is corrected to the actual SOC. Accordingly, even if it is determined that the SOC derived before the polarization is eliminated is 100% (S11, S12), the corrected SOC after the polarization is eliminated (S15) may be less than 100%. Thus, the charging controller 80 determines whether the SOC (S15) derived after the polarization is eliminated has reached 100% (S16).

If the derived SOC has not reached 100% (NO in S16), the charging controller sets the first switch 20 to the on state to charge the high-voltage battery 12 by the solar photovoltaic power generation device 10 (S17). The charging controller 80 derives the SOC of the high-voltage battery 12 again (S15), and determines whether the SOC has reached 100% (S16). As described above, the charging controller 80 continues the charging of the high-voltage battery 12 by the solar photovoltaic power generation device 10 until the SOC reaches 100%. If the SOC has reached 100% (YES in S16), the charging controller 80 ends the series of processes. At this time, the charging controller 80 may set the first switch 20 to the off state to interrupt the charging of the high-voltage battery 12 by the solar photovoltaic power generation device 10. Steps S16 and S17 may be omitted, and the charging controller 80 may end the series of processes after deriving the SOC in step S15.

If, in step S12, the SOC derived in step S11 has not reached 100% (NO in S12), the charging controller 80 proceeds to "A" in FIG. 7 through "A" in FIG. 6, and performs the processing of step S20 and subsequent steps.

As illustrated in FIG. 7, in step S20, the charging controller 80 determines whether the prediction of the idle time is valid (S20). As described above, the charging controller 80 can use a predetermined learning model based on the history data accumulated in the storage device 68 to derive the predicted idle time. Determining whether the prediction of the idle time is valid corresponds to determining whether the predetermined learning model is valid to the extent that the predicted idle time can be appropriately derived. For example, when history data for a predetermined number of days or more is not accumulated in the storage device 68, an appropriate learning model may be difficult to construct. From this, for example, if history data for a predetermined number of days or more is accumulated, the charging controller 80 can construct an appropriate learning model, and thus may determine that the prediction of the idle time is valid. The predetermined number of days may be set to any value that allows an appropriate learning model to be constructed.

If it is determined that the prediction of the idle time is not valid (NO in S20), it is not appropriate to determine whether to perform a process of eliminating the polarization of the high-voltage battery 12 in accordance with the length of the predicted idle time. In this case, the charging controller 80 sets the first switch 20 to the on state (S21). Accordingly, the high-voltage battery 12 is charged by the solar photovoltaic power generation device 10.

Then, the charging controller 80 derives the SOC of the high-voltage battery 12 based on the detection result obtained by the first voltage sensor 62 (S22). The charging controller 80 determines whether the derived SOC has reached 100% (S23). If the derived SOC has not reached 100% (NO in S23), the charging controller 80 maintains the first switch 20 in the on state (S21) and continues the charging of the high-voltage battery 12 by the solar photovoltaic power generation device 10. As described above, the charging controller 80 continues the charging of the high-voltage battery 12 by the solar photovoltaic power generation device 10 until the SOC of the high-voltage battery 12 reaches 100%.

If the derived SOC has reached 100% (YES in S23), the charging controller 80 sets the first switch 20 to the off state (S24). Accordingly, the charging of the high-voltage battery 12 by the solar photovoltaic power generation device 10 is interrupted.

After that, the charging controller 80 determines whether the polarization elimination time has elapsed, based on the time point at which the first switch 20 is switched from the on state to the off state (S25). If the polarization elimination time has not elapsed (NO in S25), the charging controller 80 waits for the polarization elimination time to elapse.

If the polarization elimination time has elapsed (YES in S25), the polarization of the high-voltage battery 12 can be considered to have been eliminated. Then, the charging controller 80 proceeds to "B" in FIG. 6 through "B" in FIG. 7, and performs the processing of step S15 and the subsequent steps described above.

If it is determined in step S20 that the prediction of the idle time is valid (YES in S20), the charging controller 80 derives the predicted idle time by using the predetermined learning model (S30).

The charging controller 80 acquires, from a server device that provides a weather forecast, predicted values of the amounts of solar radiation at and after the current time point through the communication device 60 (S31). The charging controller 80 derives the suppliable capacity of the low-voltage battery 14 by the solar photovoltaic power generation device 10, based on the obtained predicted values of the amounts of solar radiation and the polarization elimination time set in advance (S32).

The charging controller 80 subtracts the lower limit capacity of the low-voltage battery 14 from the full charge capacity of the low-voltage battery 14 to derive the maximum difference capacity (S33). The charging controller 80 derives the current capacity of the low-voltage battery 14, based on the detection result obtained by the second voltage sensor 64 (S34). The charging controller 80 subtracts the current capacity of the low-voltage battery 14 from the full charge capacity of the low-voltage battery 14 to derive the free capacity of the low-voltage battery 14 (S35). The charging controller 80 proceeds to "C" in FIG. 8 through "C" in FIG. 7, and performs the processing of step S40 and subsequent steps.

As illustrated in FIG. 8, in step S40, the charging controller 80 determines whether the suppliable capacity is larger than the maximum difference capacity (S40).

If it is determined that the suppliable capacity is larger than the maximum difference capacity (YES in S40), this is the same as determining that the first condition is satisfied. In this case, the charging controller 80 subtracts the lower limit capacity of the low-voltage battery 14 from the current capacity of the low-voltage battery 14 to derive the current difference capacity. Then, the charging controller 80 sets the amount of power transferred from the low-voltage battery 14 to the high-voltage battery 12 as the derived current difference capacity (S41), and then proceeds to the processing of step S45.

If it is determined in step S40 that the suppliable capacity is less than or equal to the maximum difference capacity (NO in S40), the charging controller 80 determines whether the suppliable capacity is larger than the free capacity (S42).

If it is determined that the suppliable capacity is larger than the free capacity (YES in S42), this is the same as determining that the second condition is satisfied. In this case, the charging controller 80 subtracts the free capacity from the suppliable capacity to derive the difference charge capacity. Then, the charging controller 80 sets the amount of power transferred from the low-voltage battery 14 to the high-voltage battery 12 as the derived difference charge capacity (S43), and then proceeds to the processing of step S45.

If it is determined that the suppliable capacity is less than or equal to the free capacity (NO in S42), this is the same as determining that the third condition is satisfied. In this case, the charging controller 80 determines that no power is to be transferred from the low-voltage battery 14 to the high-voltage battery 12 (S44), and then proceeds to the processing of step S45.

In step S45, the charging controller 80 derives a predicted value of the power transfer time for transferring the determined amount of power from the low-voltage battery 14 to the high-voltage battery 12 (S45). For example, if the amount of power to be transferred is determined to be the current difference capacity, the charging controller 80 derives a predicted value of the power transfer time for transferring the current difference amount of power. If the amount of power to be transferred is determined to be the difference charge capacity, the charging controller 80 derives a predicted value of the power transfer time for transferring power corresponding to the difference charge capacity. If it is determined that no power is to be transferred, the charging controller 80 sets the power transfer time to zero.

After deriving the power transfer time, the charging controller 80 derives a predicted value of the charging time of the high-voltage battery after the polarization is eliminated, based on the predicted value of the amount of solar radiation (S46).

The charging controller 80 calculates the sum of the predicted value of the power transfer time, the polarization elimination time, and the predicted value of the charging time of the high-voltage battery 12 to derive the specific time (S47). The charging controller 80 may calculate the sum of the power transfer time and the polarization elimination time to derive the specific time.

Then, the charging controller 80 determines whether the predicted idle time is longer than the specific time (S48). If it is determined that the predicted idle time is less than or equal to the specific time (NO in S48), the charging controller 80 proceeds to "D" in FIG. 7 through "D" in FIG. 8, and performs the processing of step S21 and the subsequent steps described above.

If it is determined that the predicted idle time is longer than the specific time (YES in S48), the charging controller 80 proceeds to "E" in FIG. 9 through "E" in FIG. 8, and performs the processing of step S50 and subsequent steps.

As illustrated in FIG. 9, in step S50, the charging controller 80 determines whether the suppliable capacity is larger than the maximum difference capacity (S50).

If it is determined that the charging difference capacity is larger than the maximum difference capacity (YES in S50), this is the same as determining that the first condition is satisfied. Then, the charging controller 80 sets the first switch 20 to the off state (S51) and sets the third switch to the on state (S52). Accordingly, the charging of the high-voltage battery 12 by the solar photovoltaic power generation device 10 is interrupted, and power is transferred from the low-voltage battery 14 to the high-voltage battery 12.

The charging controller 80 waits for the transfer of power corresponding to the current difference capacity to be completed (NO in S53). If the transfer of power corresponding to the current difference capacity is completed (YES in S53), the charging controller 80 sets the third switch 24 to the off state (S54) and sets the second switch 22 to the on state (S55). Accordingly, the high-voltage battery 12 is isolated from the solar photovoltaic power generation device 10 and the low-voltage battery 14, thereby acting on the high-voltage battery 12 such that the polarization is eliminated. In addition, the low-voltage battery 14 is charged by the solar photovoltaic power generation device 10.

The charging controller 80 determines whether the polarization elimination time has elapsed, based on the time point (for example, step S54) at which the high-voltage battery 12 is isolated from the solar photovoltaic power generation device 10 and the low-voltage battery 14 (S56). If the polarization elimination time has not elapsed (NO in S56), the charging controller 80 waits for the polarization elimination time to elapse. If the polarization elimination time has elapsed (YES in S56), the polarization of the high-voltage battery 12 can be considered to have been eliminated. Then, the charging controller 80 sets the second switch 22 to the off state (S57) to complete the charging of the low-voltage battery 14 by the solar photovoltaic power generation device 10. Then, the charging controller 80 proceeds to "F" in FIG. 6 through "F" in FIG. 9, and performs the processing of step S15 and the subsequent steps described above. That is, the high-voltage battery 12 is charged by the solar photovoltaic power generation device 10.

If it is determined in step S50 that the suppliable capacity is less than or equal to the maximum difference capacity (NO in S50), the charging controller 80 determines whether the suppliable capacity is larger than the free capacity (S60).

If it is determined that the suppliable capacity is larger than the free capacity (YES in S60), this is the same as determining that the second condition is satisfied. Then, the charging controller 80 sets the first switch 20 to the off state (S61) and sets the third switch 24 to the on state (S62). Accordingly, the charging of the high-voltage battery 12 by the solar photovoltaic power generation device 10 is interrupted, and power is transferred from the low-voltage battery 14 to the high-voltage battery 12.

The charging controller 80 waits for the transfer of power corresponding to the difference charge capacity to be completed (NO in S63). If the transfer of power corresponding to the difference charge capacity is completed (YES in S63), the charging controller 80 sets the third switch 24 to the off state (S54) and sets the second switch 22 to the on state (S55). Accordingly, the high-voltage battery 12 is isolated from the solar photovoltaic power generation device 10 and the low-voltage battery 14, thereby acting on the high-voltage battery 12 such that the polarization is eliminated. In addition, the low-voltage battery 14 is charged by the solar photovoltaic power generation device 10.

As described above, the charging controller 80 determines whether the polarization elimination time has elapsed, based on the time point (for example, step S54) at which the high-voltage battery 12 is isolated from the solar photovoltaic power generation device 10 and the low-voltage battery 14 (S56). Then, as described above, if the polarization elimination time has elapsed (YES in S56), the charging controller 80 sets the second switch 22 to the off state (S57), and performs the processing of step S15 and the subsequent steps. That is, the high-voltage battery 12 is charged by the solar photovoltaic power generation device 10.

If it is determined in step S60 that the suppliable capacity is less than or equal to the free capacity (NO in S60), this is the same as determining that the third condition is satisfied. Then, the charging controller 80 transfers no power from the low-voltage battery 14 to the high-voltage battery 12. In this case, accordingly, the charging controller 80 sets the first switch 20 to the off state (S64) and sets the second switch 22 to the on state (S55). Accordingly, the high-voltage battery 12 is isolated from the solar photovoltaic power generation device 10 and the low-voltage battery 14, thereby acting on the high-voltage battery 12 such that the polarization is eliminated. In addition, the low-voltage battery 14 is charged by the solar photovoltaic power generation device 10.

As described above, the charging controller 80 determines whether the polarization elimination time has elapsed, based on the time point (for example, step S64) at which the high-voltage battery 12 is isolated from the solar photovoltaic power generation device 10 and the low-voltage battery 14 (S56). Then, as described above, if the polarization elimination time has elapsed (YES in S56), the charging controller 80 sets the second switch 22 to the off state (S57), and performs the processing of step S15 and the subsequent steps. That is, the high-voltage battery 12 is charged by the solar photovoltaic power generation device 10.

When the ready-on operation is detected by the start switch 66 during the series of processes in FIG. 6 to FIG. 9, the charging controller 80 may stop the series of processes and cause the vehicle 1 to transition to the ready-to-travel state. In this case, for example, the charging controller 80 sets the first switch 20 to the on state, sets the second switch 22 to the off state, and sets the third switch 24 to the off state.

As described above, the charging controller 80 of the vehicle 1 of the present embodiment derives the predicted idle time in response to a transition of the state of the vehicle 1 from the ready-to-travel state to the parked state. The charging controller 80 determines whether the predicted idle time is longer than a specific time including the polarization elimination time of the high-voltage battery 12. If it is determined that the predicted idle time is longer than the specific time, the charging controller 80 performs control to set the first switch 20 to the off state and set the second switch 22 to the on state such that the power generated by the solar photovoltaic power generation device 10 is supplied to the low-voltage battery 14.

Accordingly, in the vehicle 1 of the present embodiment, the polarization of the high-voltage battery 12 can be appropriately eliminated. In addition, the low-voltage battery 14 is charged with the power of the solar photovoltaic power generation device 10 while the polarization is eliminated. That is, the vehicle 1 of the present embodiment can prevent the power of the solar photovoltaic power generation device 10 from being wasted while the polarization is eliminated.

In the vehicle 1 of the present embodiment, therefore, the power generated by the solar photovoltaic power generation device 10 can be used without waste.

If it is determined that the predicted idle time is longer than the specific time, the charging controller 80 of the vehicle 1 of the present embodiment performs control to set the third switch 24 to the on state to transfer a predetermined amount of power from the low-voltage battery 14 to the high-voltage battery 12. After the transfer of power from the low-voltage battery 14 to the high-voltage battery 12 is completed, the charging controller 80 performs control to set the third switch 24 to the off state and set the second switch 22 to the on state such that the power generated by the solar photovoltaic power generation device 10 is supplied to the low-voltage battery 14.

In the vehicle 1 of the present embodiment, accordingly, the charging of the low-voltage battery 14 by the solar photovoltaic power generation device 10 during the polarization elimination time of the high-voltage battery 12 can be performed to the maximum extent possible. As a result, in the vehicle 1 of the present embodiment, the power generated by the solar photovoltaic power generation device 10 can be used without waste.

Further, the charging controller 80 of the vehicle 1 of the present embodiment determines whether the first condition that the suppliable capacity is larger than the maximum difference capacity is satisfied. If it is determined that the first condition is satisfied, the charging controller 80 transfers the power corresponding to the current difference capacity in a power transfer process from the low-voltage battery 14 to the high-voltage battery 12. In the vehicle 1 of the present embodiment, accordingly, the charging of the low-voltage battery 14 by the solar photovoltaic power generation device 10 can be performed to the maximum extent possible. In addition, the capacity of the low-voltage battery 14 at the time point when the charging is completed can be set to the full charge capacity.

Further, the charging controller 80 of the vehicle 1 of the present embodiment determines whether the second condition that the suppliable capacity is less than or equal to the maximum difference capacity and the suppliable capacity is larger than the free capacity is satisfied. If it is determined that the second condition is satisfied, the charging controller 80 transfers the power corresponding to the difference charge capacity in a power transfer process from the low-voltage battery 14 to the high-voltage battery 12. In the vehicle 1 of the present embodiment, accordingly, the charging of the low-voltage battery 14 by the solar photovoltaic power generation device 10 can be performed to the maximum extent possible. In addition, the capacity of the low-voltage battery 14 at the time point when the charging is completed can be set to the full charge capacity.

Further, the charging controller 80 of the vehicle 1 of the present embodiment determines whether the third condition that the suppliable capacity is less than or equal to the free capacity is satisfied. If it is determined that the third condition is satisfied, the charging controller 80 performs control to supply power from the solar photovoltaic power generation device 10 to the low-voltage battery 14 without power transfer from the low-voltage battery 14 to the high-voltage battery 12. In the vehicle 1 of the present embodiment, no power is transferred from the low-voltage battery 14 to the high-voltage battery 12, thereby preventing a situation in which when the charging of the low-voltage battery 14 by the solar photovoltaic power generation device 10 is completed, the capacity of the low-voltage battery 14 is reduced compared to before the charging is performed.

Although an embodiment of the present invention has been described with reference to the accompanying drawings, it is needless to say that the present invention is not limited to the embodiment. It will be apparent to those skilled in the art that various changes and modifications can be made without departing from the scope as defined by the appended claims and that such changes and modifications also fall within the technical scope of the present invention.

REFERENCE SIGNS LIST 1 vehicle
10 solar photovoltaic power generation device
12 high-voltage battery
14 low-voltage battery
20 first switch
22 second switch
24 third switch
40 control device
70 processor
72 memory

The invention claimed is:

1. A vehicle comprising:
a solar photovoltaic power generation device;
a high-voltage battery;
a low-voltage battery;
a first switch capable of turning on and off electrical coupling between the solar photovoltaic power generation device and the high-voltage battery;
a second switch capable of turning on and off electrical coupling between the solar photovoltaic power generation device and the low-voltage battery; and
a control device configured to control on and off of the first switch and the second switch,
the control device comprising:
one or more processors; and
one or more memories coupled to the one or more processors,
the one or more processors being configured to execute a process comprising:
performing control to set the first switch to an on state such that power generated by the solar photovoltaic power generation device is supplied to the high-voltage battery while the vehicle is in a ready-to-travel state;
in response to a transition of a state of the vehicle from the ready-to-travel state to a parked state, deriving a predicted idle time indicating a predicted value of a time for which the vehicle is left idle in the parked state;
determining whether the predicted idle time is longer than a specific time comprising a polarization elimination time, the polarization elimination time being a time taken to eliminate polarization of the high-voltage battery; and
when it is determined that the predicted idle time is longer than the specific time, performing control to set the first switch to an off state and the second switch to an on state such that the power generated by the solar photovoltaic power generation device is supplied to the low-voltage battery.

2. The vehicle according to claim 1, further comprising a third switch capable of turning on and off electrical coupling between the high-voltage battery and the low-voltage battery, wherein
the control device is configured to control on and off of the first switch, the second switch, and the third switch, and
the one or more processors are configured to
in the process, when it is determined that the predicted idle time is longer than the specific time, execute a process comprising:
setting the first switch to the off state;
performing control to set the third switch to an on state to cause a transfer of a predetermined amount of power from the low-voltage battery to the high-voltage battery; and
after the transfer of power from the low-voltage battery to the high-voltage battery is completed, performing control to set the third switch to an off state and set the second switch to the on state such that the power generated by the solar photovoltaic power generation device is supplied to the low-voltage battery.

3. The vehicle according to claim 2, wherein
the one or more processors are configured to execute a process comprising:
deriving a suppliable capacity, the suppliable capacity being a capacity by which the power generated by the solar photovoltaic power generation device is suppliable to the low-voltage battery within the polarization elimination time;
determining whether a first condition is satisfied, the first condition being a condition that the suppliable capacity is larger than a maximum difference capacity, the maximum difference capacity being a value obtained by subtracting a lower limit capacity of the low-voltage battery from a full charge capacity of the low-voltage battery; and
when it is determined that the first condition is satisfied, in a process for causing the transfer of power from the low-voltage battery to the high-voltage battery, transferring power corresponding to a current difference capacity, the current difference capacity being a value obtained by subtracting the lower limit capacity of the low-voltage battery from a current capacity of the low-voltage battery.

4. The vehicle according to claim 2, wherein the one or more processors are configured to execute a process comprising:
deriving a suppliable capacity, the suppliable capacity being a capacity by which the power generated by the solar photovoltaic power generation device is suppliable to the low-voltage battery within the polarization elimination time;
determining whether a second condition is satisfied, the second condition being a condition that the suppliable capacity is less than or equal to a maximum difference capacity and the suppliable capacity is greater than a free capacity, the maximum difference capacity being a value obtained by subtracting a lower limit capacity of the low-voltage battery from a full charge capacity of the low-voltage battery, the free capacity being a value obtained by subtracting a current capacity of the low-voltage battery from the full charge capacity of the low-voltage battery; and when it is determined that the second condition is satisfied, in a process for causing the transfer of power from the low-voltage battery to the high-voltage battery, transferring power corresponding to a difference charge capacity, the difference charge capacity being a value obtained by subtracting the free capacity from the suppliable capacity.

5. The vehicle according to claim 2, wherein the one or more processors are configured to execute a process comprising:

deriving a suppliable capacity, the suppliable capacity being a capacity by which the power generated by the solar photovoltaic power generation device is suppliable to the low-voltage battery within the polarization elimination time;

determining whether a third condition is satisfied, the third condition being a condition that the suppliable capacity is less than or equal to a free capacity, the free capacity being a value obtained by subtracting a current capacity of the low-voltage battery from a full charge capacity of the low-voltage battery; and when it is determined that the third condition is satisfied, performing control to supply power from the solar photovoltaic power generation device to the low-voltage battery without the transfer of power from the low-voltage battery to the high-voltage battery.

* * * * *